United States Patent
Toothman et al.

(10) Patent No.: US 9,660,446 B2
(45) Date of Patent: May 23, 2017

(54) POWER DISTRIBUTION SYSTEM FOR AN AIRCRAFT

(71) Applicants: Steven Allan Toothman, Lewisburg, OH (US); Arthur Vorwerk Radun, Mason, OH (US)

(72) Inventors: Steven Allan Toothman, Lewisburg, OH (US); Arthur Vorwerk Radun, Mason, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 761 days.

(21) Appl. No.: 14/045,912

(22) Filed: Oct. 4, 2013

(65) Prior Publication Data

US 2015/0097422 A1    Apr. 9, 2015

(51) Int. Cl.
| | |
|---|---|
| *H02G 3/00* | (2006.01) |
| *H02J 1/12* | (2006.01) |
| *B60L 1/00* | (2006.01) |
| *H02J 9/00* | (2006.01) |
| *H02J 4/00* | (2006.01) |
| *B60R 16/03* | (2006.01) |

(52) U.S. Cl.
CPC ...... *H02J 1/12* (2013.01); *B60L 1/00* (2013.01); *H02J 4/00* (2013.01); *H02J 9/00* (2013.01); *B60R 16/03* (2013.01); *B64D 2221/00* (2013.01)

(58) Field of Classification Search
CPC ...... H02J 9/00; H02J 4/00; B60L 1/00; B60R 16/03; B64D 2221/00
USPC .................. 307/23, 9.1, 43; 701/3
See application file for complete search history.

(56) References Cited

U.S. PATENT DOCUMENTS

| | | | |
|---|---|---|---|
| 8,344,544 B2 | 1/2013 | Rozman et al. | |
| 2010/0181826 A1* | 7/2010 | Fuller | B60R 16/03 307/9.1 |
| 2011/0285202 A1* | 11/2011 | Rozman | H02J 1/10 307/23 |
| 2012/0007424 A1* | 1/2012 | Maier | H02J 3/00 307/18 |
| 2012/0007427 A1* | 1/2012 | Maier | H02J 4/00 307/43 |
| 2014/0197681 A1* | 7/2014 | Iwashima | B60R 16/03 307/9.1 |

* cited by examiner

*Primary Examiner* — Arnold Kinkead
(74) *Attorney, Agent, or Firm* — GE Global Patent Operation; William S. Munnerlyn

(57) ABSTRACT

An aircraft power distribution system includes a first DC power distribution bus, a second DC power distribution bus, and a DC power source coupled with at least one of the first or second DC power distribution buses, wherein the DC power distribution buses are electrically coupled by a plurality of electrical couplings.

10 Claims, 2 Drawing Sheets

POWER DISTRIBUTION SYSTEM FOR AN AIRCRAFT

BACKGROUND OF THE INVENTION

Power systems, especially power systems in aircraft, manage the supplying of power from power sources, such as generators, to electrical loads. In aircraft, gas turbine engines are used for propulsion of the aircraft, and typically provide mechanical power which ultimately powers a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy which is distributed throughout the aircraft by electrically coupled nodes of the power distribution system. The power distribution system may fail at any of the coupled nodes, which may interrupt the electrical power distribution, as well as any equipment reliant on that power.

BRIEF DESCRIPTION OF THE INVENTION

In one aspect, an aircraft power distribution system includes a first DC power distribution bus and a second DC power distribution bus, a DC power source coupled with at least one of the first or second DC power distribution buses, a plurality of electrical couplings between the first and second DC power distribution buses, and a solid state power controller positioned in-line on each electrical coupling. Each solid state power controller further includes two power switches in a back-to-back configuration, and each power switch comprising a field-effect transistor (FET) connected across a Schottky diode. The solid state power controllers selectively couple and decouple the at least first and second DC power distribution buses across the plurality of electrical couplings.

In another aspect, a method of operating an aircraft power distribution system having at least one DC power source coupled with a first DC power distribution bus, and a second DC power distribution bus, and a solid state power controller positioned on each of a plurality of electrical couplings between the at least first and second DC power distribution buses, the method includes determining if a fault occurs in at least one electrical couplings between the first DC power distribution bus and the second DC power distribution bus, to define a faulted connection, and controlling the solid state power controllers, based on the determination of a fault, to selectively decouple the faulted connection between the first DC power distribution bus and the second DC power distribution bus, and to selectively recouple the first DC power distribution bus with the second DC power distribution bus via another electrical coupling other than the one with the faulted connection. The time to selectively recouple the first DC power distribution bus with the second DC power distribution bus is less than the time for an electrical load, coupled with the second DC distribution bus, to enter into a power interruption reset mode.

DESCRIPTION OF EMBODIMENTS OF THE INVENTION

The described embodiments of the present invention are directed to an electrical power distribution system for an aircraft, which enables production and distribution of electrical power from a turbine engine, preferably a gas turbine engine, to the electrical loads of the aircraft.

Figure 1:
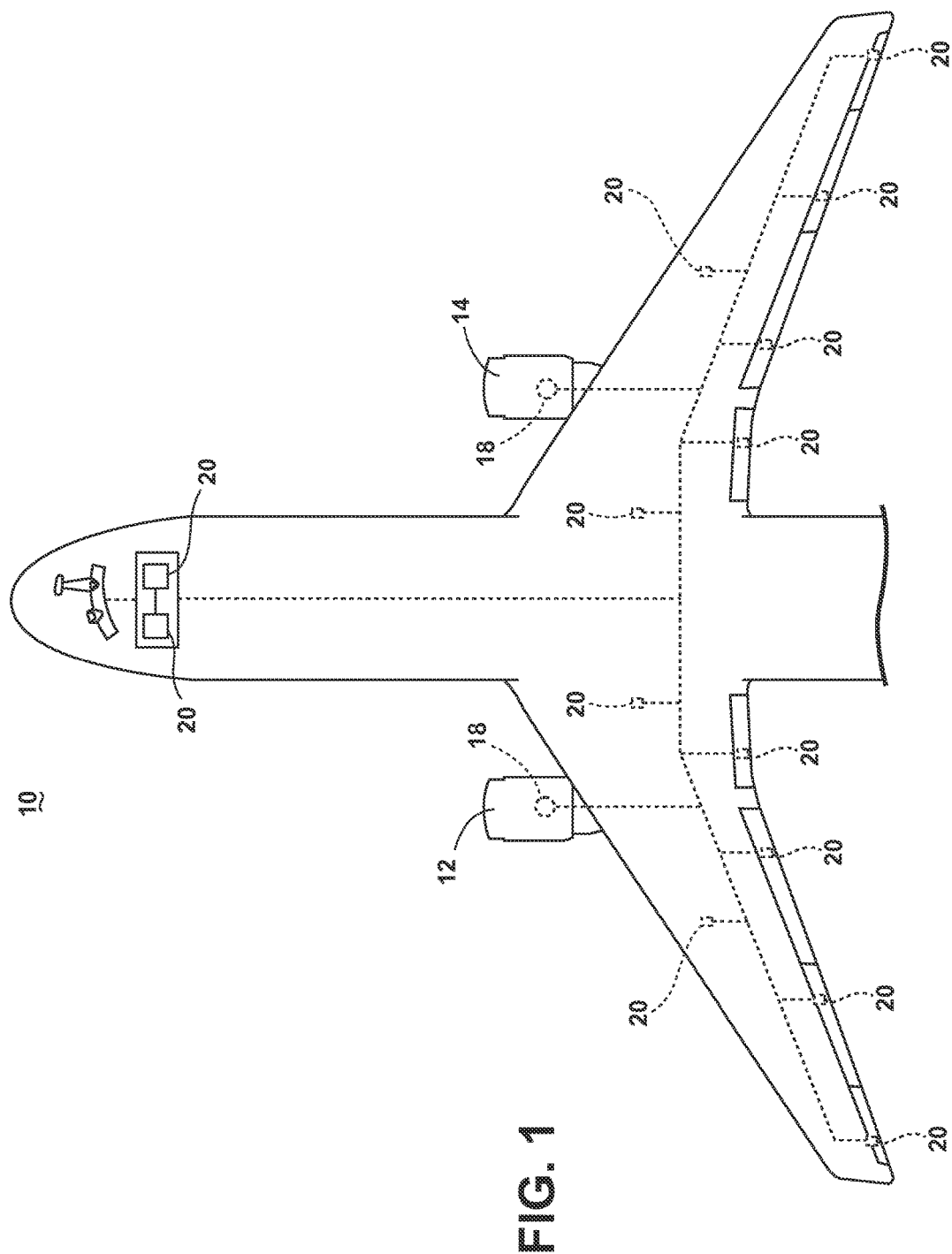
FIG. 1 is a top down schematic view of the aircraft and power distribution system in accordance with one embodiment of the invention.

As illustrated in FIG. 1, an aircraft 10 is shown having at least one gas turbine engine, shown as a left engine system 12 and a right engine system 14. Alternatively, the power system may have fewer or additional engine systems. The left and right engine systems 12, 14 may be substantially identical, and are shown further comprising at least one electric machine, such as a generator 18. The aircraft is shown further comprising a plurality of power-consuming components, or electrical loads 20, for instance, an actuator load, flight critical loads, and non-flight critical loads. Each of the electrical loads 20 are electrically coupled with at least one of the generators 18.

In the aircraft 10, the operating left and right engine systems 12, 14 provide mechanical energy which may be extracted via a spool, to provide a driving force for the generator 18. The generator 18, in turn, provides the generated power to the electrical loads 20 for load operations. Additional power sources for providing power to the electrical loads 20, such as emergency power sources, ram air turbine systems, starter/generators, or batteries, are envisioned. It will be understood that while one embodiment of the invention is shown in an aircraft environment, the invention is not so limited and has general application to electrical power systems in non-aircraft applications, such as other mobile applications and non-mobile industrial, commercial, and residential applications.

Figure 2:
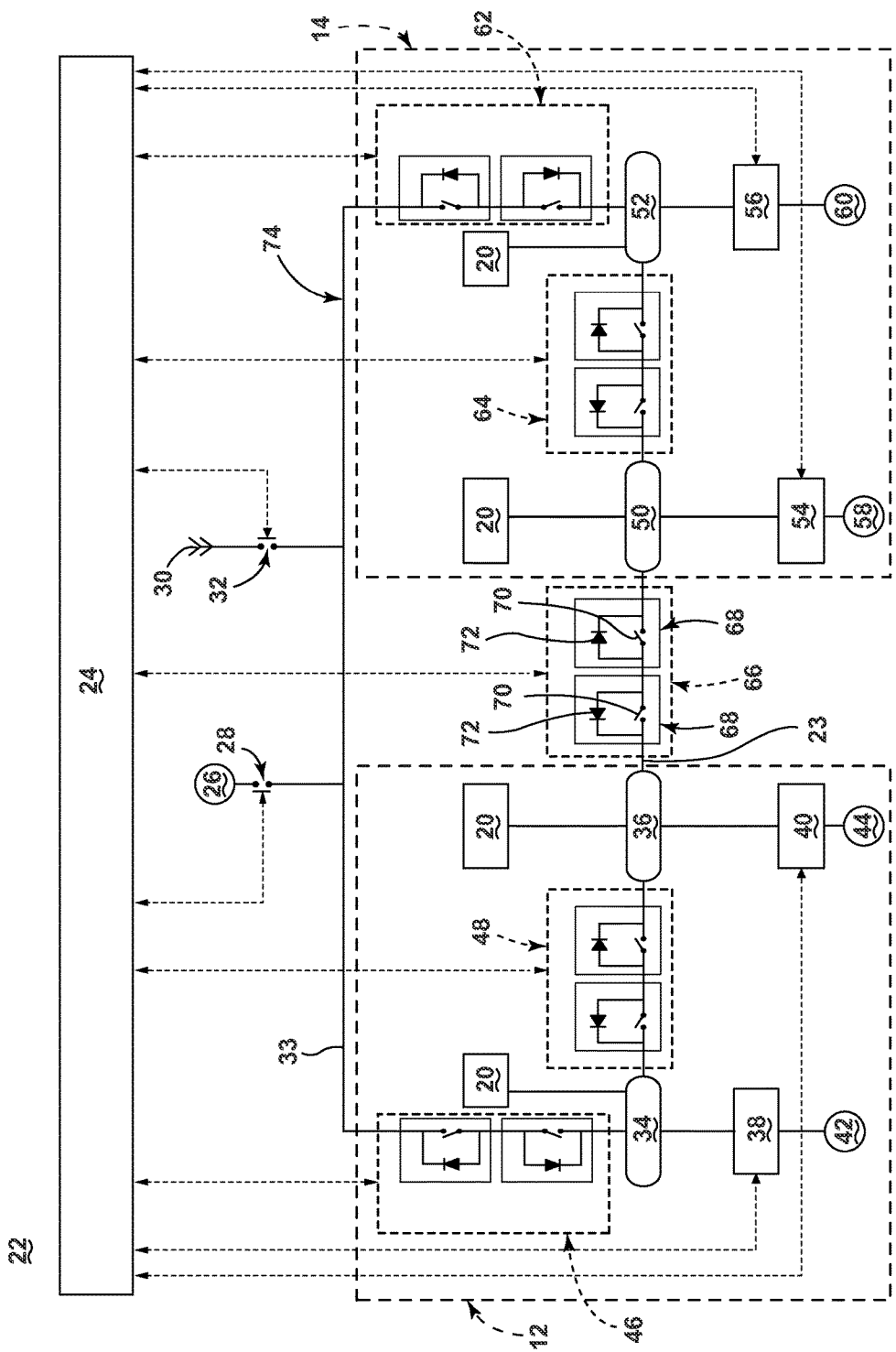
FIG. 2 is a schematic view of the power distribution system in accordance with one embodiment of the invention.

FIG. 2 illustrates a schematic block diagram of a power distribution system 22 for an aircraft having multiple engine systems, shown including the left engine system 12 and the right engine system 14, connected by an electrical coupling 23. The power distribution 22 system is shown further including a system controller 24, one or more non-engine power sources, shown as an auxiliary power unit (APU) 26 having an auxiliary power contactor (APC) 28 and an external ground power source 30 having an external power contactor (EPC) 32, and a tie bus 33 electrically connecting the left engine system 12, right engine system 14, APU 26, and external ground power source 30, in parallel. Each of the APC 28 and EPC 32 are configured to selectively couple the respective APU 26 and external ground power source 30 to the tie bus 33. Additional power sources may be envisioned in addition to, or replacing one or more of the APU 26 and/or external ground power source 30. For instance, an emergency battery system, normal operation battery or battery bank system, fuel cell system, and/or ram air turbine system may be included in the power distribution system 22, wherein each may be electrically coupled with the tie bus 33, in a parallel configuration.

The left engine system 12 is shown comprising a first DC power distribution bus 34, a second DC power distribution bus 36, a first integrated converter controller (ICC) 38, a second ICC 40, a first generator 42 capable of generating AC power, and a second generator 44 capable of generating AC power. The first DC power distribution bus 34 is connected, via electrical couplings, with at least one electrical load 20, the tie bus 33, the second DC power distribution bus 36, and the first ICC 38, which is further electrically coupled with the first generator 42. The second DC power distribution bus 34 is connected, via electrical couplings, with at least one electrical load 20 and the second ICC 40, which is further electrically coupled with the second generator 44. Each ICC 38, 40 may additionally provide a fault indication if an error occurs in the ICC 38, 40, or if the ICC 38, 40 operates outside of operational expectations. Each DC power distribution bus 34, 36 may be configured to provide, for instance 28 VDC or 270 VDC.

The left engine system 12 may further comprise a first solid state power controller (SSPC) 46 positioned in-line on the electrical coupling connecting the first DC power distribution bus 34 with the tie bus 33, such that the first SSPC 46 is between the bus 34 and the non-engine power sources 26, 30, and a second SSPC 48 positioned in-line on the electrical coupling connecting the first DC power distribution bus 34 with the second DC power distribution bus 36.

The left and right engine systems 12, 14 may be substantially identical. Thus, the right engine system 14 is shown comprising a third DC power distribution bus 50, a fourth DC power distribution bus 52, a third integrated converter controller (ICC) 54, a fourth ICC 56, a third generator 58 capable of generating AC power, and a fourth generator 60 capable of generating AC power. The third DC power distribution bus 50 is connected, via electrical couplings, with at least one electrical load 20 and the third ICC 54, which is further electrically coupled with the third generator 58. The fourth DC power distribution bus 52 is connected, via electrical couplings, with at least one electrical load 20, the tie bus 33, the third DC power distribution bus 50, and the fourth ICC 56, which is further electrically coupled with the fourth generator 60. Each ICC 54, 56 may additionally provide a fault indication if an error occurs in the ICC 54, 56, or if the ICC 54, 56 operates outside of operational expectations. Each DC power distribution bus 50, 52 may be configured to provide, for instance 28 VDC or 270 VDC.

The right engine system 14 may further comprise a third SSPC 62 positioned in-line on the electrical coupling connecting the fourth DC power distribution bus 52 with the tie bus 33, such that the third SSPC 62 is between the bus 34 and the non-engine power sources 26, 30, and a fourth SSPC 64 positioned in-line on the electrical coupling connecting the third DC power distribution bus 50 with the fourth DC power distribution bus 52. The power distribution system 22 further comprises a fifth SSPC 66 positioned in-line on the electrical coupling connecting the second DC power distribution bus 36 of the left engine system 12 with the third DC power distribution bus 50 of the right engine system 14. The combined configuration of the tie bus 33, the SSPCs 46, 48, 62, 64, 66, and the DC power distribution buses 34, 36, 50, 52 defines a ring-type bus configuration 74.

Each SSPC 46, 48, 62, 64, 66 comprises two power switches 68 in a back-to-back configuration, with each power switch 68 further comprising a field-effect transistor (FET) 70 (illustrated as a switch) connected across a diode, such as a Schottky diode 72. Stated another way, the FET 70 and Schottky diode 72 of each power switch 68 are configured in parallel. The FET 70 may further comprise a metal-oxide-semiconductor field-effect transistor (MOSFET), such as silicon carbide or gallium nitride MOSTFET, to allow for high power and high speed switching operations. Additionally, it is envisioned each SSPC 46, 48, 62, 64, 66 may be configured with power sensing capabilities to provide a fault indication if a fault occurs within, or on either side of, the SSPC 46, 48, 62, 64, 66.

As illustrated, the back-to-back configuration is defined by an arrangement of the power switches 68 such that the Schottky diode 72 of each switch 68 is forward-biased away from the opposing switch 68. The back-to-back configuration of the power switches 68 provides each SSPC 46, 48, 62, 64, 66 a selectively energized, or conducting mode, and a selectively de-energized, or non-conducting mode. During the energized mode, the FET 70 of each power switch 68 is controlled such that the SSPC 46, 48, 62, 64, 66 allows for electrical coupling between two DC power distribution buses, for instance, the first and second DC power distribution buses 34, 36. During the de-energized mode, the FET 70 of each power switch 68 is controlled such that the SSPC 46, 48, 62, 64, 66 prevents electrical coupling between two DC power distribution buses. Additionally, the location of the first SSPC 46 and third SSPC 62 allow these SSPCs 46, 62 to selectively couple and decouple their respective first and fourth DC power distribution buses 34, 52 from the tie bus 33, and consequently, the non-engine power sources 26, 30, during their respective energizing and non-conducting modes.

The system controller 24 of the power distribution system 22 is electrically coupled with each of the SSPCs 46, 48, 62, 64, 66, each ICC 38, 40, 54, 56, the APC 28, and the EPC 32 such that the controller 24 may be in bidirectional communication with, and capable of controlling, each of the aforementioned components. The system controller 24 may, for instance, independently control each of the aforementioned components or control a plurality of components as a group, as necessary.

While a left engine system 12 and a right engine system 14 are shown, alternative embodiments are envisioned having more engine systems for the aircraft. Each engine system may be substantially identical to those illustrated, and may operate in substantially similar fashions. Additionally, while generators 42, 44, 58, 60 are described, it is envisioned that one or more generators 42, 44, 58, 60 may alternatively be replaced by a starter/generator, for providing left or right engine system 12, 14 starting functionality. Additionally, alternative embodiments are envisioned wherein each engine system 12, 14 may have more or fewer generators, ICCs, and DC power distribution buses, so long as an SSPC is positioned in-line with each electrical coupling between DC power distribution buses, and in-line with each electrical coupling between a DC power distribution bus and a non-engine power source.

During operation of the power distribution system 22, the running gas turbine engines of the left and right engine systems 12, 14 provide mechanical power used by each of the respective first and second generators 42, 44 and third and fourth generators 54, 56 to generate an AC power output. The AC power output of each generator is supplied to a respective ICC 38, 40, 54, 56, each of which is controlled by the system controller 24 to act as an AC to DC rectifier, provide a controlled DC power output, such as 270 VDC, to each respective DC power distribution bus 34, 36, 50, 52, which is used to power the electrical loads 20.

The DC power distribution buses 34, 36, 50, 52 may additionally supply power to, or receive power from each other through a plurality of selective electrical coupling paths between each DC power distribution buses 34, 36, 50, 52, due to the ring-type bus configuration 74. Each of the pluralities of electrical coupling paths between DC power distribution buses 34, 36, 50, 52 may be controlled by the system controller 24 selectively energizing or de-energizing each individual or plurality of SSPCs 46, 48, 62, 64, 66, via a control signal, during normal bus switching operation. For example, the first DC power distribution bus 34 may supply DC power to the second DC power distribution bus 36 via at least two electrical coupling paths controlled by the selective coupling or decoupling of the system controller 24: directly through the second SSPC 48; and around the ring-type bus configuration 74, via the first SSPC 46, tie bus 33, third SSPC 62, fourth DC power distribution bus 52, fourth SSPC 64, third DC power distribution bus 50, fifth SSPC 66, to the second DC power distribution bus 36.

In this sense, the system controller 24 may be capable of controlling the power distribution system 22 to redirect power distribution. For example, the system controller 24 may determine if a fault occurs, in at least one DC power distribution bus 34, 36, 50, 52, SSPC 46, 48, 62, 64, 66, ICC 38, 40, 54, 56, or generator 42, 44, 58, 60, by way of the bidirectional communication between the controller 24 and the aforementioned components capable of indicating a fault. This determination of a fault may further distinguish between a clearable fault and a permanent fault, such as a short in an electrical coupling. If a fault is determined to have occurred, the system controller 24 may define the particular faulted component or connection.

After the system controller 24 determines a fault has or is occurring, it may selectively decouple or isolate the faulted component or connection from the power distribution system 22, and, if possible, re-route or recouple the power distribution path through another electrical coupling other than the faulted component.

For example, if an electrical fault occurs, the system controller 24 may be alerted to a faulted condition via a fault indictor from one or more of the first SSPC 46, the second SSPC 48, the fifth SSPC 66, first ICC 38, or second ICC 40. The system controller 24 may then use the fault indicators to determine or verify if a fault is occurring, and where a fault is occurring, if necessary. For example, the system controller 24 may determine and define a fault is occurring at the second SSPC 48, based on the fault indicators received.

The controller 24 may further determine if the fault is a permanent fault or a clearable fault based on the fault indicators received. If the fault indicators received indicate a permanent failure of the second SSPC 48, the system controller 24 may selectively control the SSPCs 46, 48, 62, 64, 66, to decouple the second SSPC 48 from the first and second DC power distribution buses 34, 36, and couple the first, third, fourth, and fifth SSPCs 46, 62, 64, 66 to provide an alternate power distribution path between the buses 34, 36. In this example, the power distribution system 22 may selectively decouple (via the second SSPC 48) and recouple (via SSPCs 46, 62, 64, 66) the first and second DC power distribution buses 34, 36 in less than the time for an electrical load 20 to detect a potential power interruption, and thus, prevent the electrical load 20 from entering into a power interruption reset mode. One non-limiting example of the time it may take to collectively decouple and recouple the first and second DC power distribution buses 34, 36, via another electrical path, may be less than 50 milliseconds.

In an alternate operation of the power distribution system 22, wherein the fault indicators received by the system controller 24 indicate a clearable fault of, for example, the second SSPC 48, the system controller 24 may selectively control the second SSPC 48 to decouple the first and second DC power distribution buses 34, 36, and then selectively control the second SSPC 48 to recouple the buses 34, 36 such that the decoupling and recoupling resets or clears the fault indication. Again, it is envisioned that the decoupling and recoupling of the first and second DC power distribution buses 34, 36 via the second SSPC 48 occurs in less than the time for an electrical load 20 to detect a potential power interruption, and thus, prevent the electrical load from entering into a power interruption reset mode. One non-limiting example of the time it may take to collectively decouple and recouple the first and second DC power distribution buses 34, 36 may be less than 50 milliseconds.

Additionally during operation of the power distribution system 22, the non-engine power sources 26, 30 may provide primary or supplement power to one or more DC power distribution buses 34, 36, 50, 52, via the tie bus 33 and the first SSPC 46 and/or third SSPC 62. For instance, the system controller 24 may control the APC 28 to electrically couple the APU 26 with the tie bus 33 to supply supplemental power to the power distribution system 22 during transient moments of high power requirements. In another instance, the system controller 24 may control the EPC 32 to electrically couple the external ground power source 30 to the tie bus 33 to supply starting power to the tie bus 33, and consequently to a starter/generator, to provide starting functionality for the left or right engine system 12, 14.

In this sense, the system controller 24 may additionally be capable of controlling the power distribution system 22 coupled with a non-engine power source 26, 30 in the event a fault occurs. Similar to the examples above, if either the first or fourth DC power distribution bus 34, 52 fails due to a fault, the system controller 24 may controllably decouple the bus 34, 52 from the power distribution system 22 by controlling the corresponding first and second SSPCs 46, 48, or third and fourth SSPCs 62, 64 in order to isolate the faulted bus 34, 52 from the power distribution system 22 while still allowing the non-engine power sources 26, 30 to supply power to the remaining, non-faulted buses. Similarly, in an example wherein the third DC power distribution bus 50 generates a permanent or clearable fault while a non-engine power source 26, 30 is supplying power, the system controller 24 may isolate the bus 50 by controlling the fourth and fifth SSPCs 64, 66 to decouple the bus 33 from the power distribution system 22.

Also similar to the method described above, it is envisioned that the power distribution system 22 may determine if a DC power distribution bus should be isolated from the tie bus 33 or the system 22 due to a fault, then control the SSPCs 46, 48, 62, 64, 66, based on this determination, to selectively decouple the faulted DC power distribution bus from the tie bus 33 or system 22 in less than the time for an electrical load 20 to detect a potential power interruption, and thus, prevent the electrical load 20 from entering into a power interruption reset mode. Also similar to the method described above, if the power distribution system 22 determines the DC power distribution bus fault may be cleared, the system controller 24 may selectively decouple and then recouple the faulted DC power distribution bus to the tie bus 33 or system 22, such that the decoupling/recoupling clears the fault, in less than the time for an electrical load 20 to detect a potential power interruption, and thus, prevent the electrical load 20 from entering into a power interruption reset mode.

The embodiments disclosed herein provide a power distribution system. One advantage that may be realized in the above embodiments is that the above described embodiments have superior weight and size advantages over the conventional type power distribution systems due to reduced weight and volume requirements of the solid state power controllers located in bus sharing equipment. Another advantage that may be realized in the above embodiments is that the plurality of selectable power distribution paths provides a robust power distribution system with improved immunity from one or more electrical faults, reducing the likelihood of partial or total aircraft electrical failure. Yet another advantage of the above described embodiments is that the operation of coupling and decoupling the DC power distribution buses by solid state FETs provide for increased reliability because of the lack of mechanical componentry, and thus, reduces the likelihood of mechanical failure in the power distribution system. Even yet another advantage of the above described embodiments is that the embodiments provide a power distribution system with high speed switching that provides detection of faults, and alternate routing or clearing of the said faults, in less time than it takes for the electrical loads to enter into a power interruption reset mode, which provides for uninterrupted electrical load operation despite an electrical fault.

When designing aircraft components, important factors to address are size, weight, and reliability. The above described power distribution system has a decreased number of parts as the system will be able to provide regulated power distribution, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft power distribution system, comprising:
   a first DC power distribution bus, a second DC power distribution bus, and a third DC power distribution bus;
   a DC power source coupled with at least one of the first, second, or third DC power distribution buses;
   a set of electrical couplings, wherein electrical couplings included in the set are coupled between the first, second, and third DC power distribution buses, and the set of electrical couplings enable transmission of power between the first, second and third DC power distribution buses; and
   a solid state power controller positioned in-line on each electrical coupling, each solid state power controller comprising two power switches in a back-to-back configuration, each power switch comprising a field-effect transistor (FET) connected across a Schottky diode;
   wherein a configuration of the first, second and third DC power distribution buses and the solid state power controllers defines a ring-type bus configuration, and the solid state power controllers selectively couple and decouple the first, second, and third DC power distribution buses across the set of electrical couplings.

2. The aircraft power distribution system of claim 1 wherein the DC power source comprises at least one of a generator or a starter/generator.

3. The aircraft power distribution system of claim 1, further comprising a second DC power source coupled with the other of the at least first or second DC power distribution buses.

4. The aircraft power distribution system of claim 1 wherein the FET comprises a metal-oxide-semiconductor field-effect transistor (MOSFET).

5. The aircraft power distribution system of claim 4 wherein the MOSFET comprises at least one of silicone carbide or gallium nitride.

6. The aircraft power distribution system of claim 1 wherein the DC power source provides at least one of 28 VDC or 270 VDC.

7. The aircraft power distribution system of claim 1 further comprising at least one DC electrical load coupled with each of the first and second DC power distribution buses.

8. The aircraft power distribution system of claim 1 wherein the FET and Schottky diode are configured in parallel.

9. The aircraft power distribution system of claim 8 wherein the back-to-back configuration further comprises an arrangement of the two power switches such that each Schottky diode is forward-biased away from the opposing power switch.

10. The aircraft power distribution system of claim 1 wherein each of the solid state power controllers are independently operable.

* * * * *